United States Patent [19]
Smith et al.

[11] Patent Number: 5,773,504
[45] Date of Patent: Jun. 30, 1998

[54] HETEROGENEOUS SILICA CARBON BLACK-FILLED RUBBER COMPOUND

[75] Inventors: Richard Robinson Smith, Cuyahoga Falls; Kevin James Pyle, Uniontown, both of Ohio

[73] Assignee: The Goodyear Tire & Rubber Company, Akron, Ohio

[21] Appl. No.: 827,767

[22] Filed: Apr. 11, 1997

Related U.S. Application Data

[63] Continuation of Ser. No. 527,395, Sep. 13, 1995.

[51] Int. Cl.[6] ............................................ C08K 3/00
[52] U.S. Cl. .......................... 524/492; 524/493; 524/495; 524/496
[58] Field of Search ................................ 524/492, 493, 524/495, 496

[56] References Cited

U.S. PATENT DOCUMENTS

| | | | |
|---|---|---|---|
| 3,873,489 | 3/1975 | Thurn et al. ............................ | 260/33.6 |
| 5,066,721 | 11/1991 | Hamada et al. ....................... | 525/102 |
| 5,227,425 | 7/1993 | Rauline .................................. | 524/493 |
| 5,494,955 | 2/1996 | Swor et al. ............................. | 524/496 |

OTHER PUBLICATIONS

Lee, B L, "Controlled Ingredient–Distribution Mixing: Effect on Some Properties of Elastomer Blend Compounds." American Chemical Society (1984), 12, p. 186.

Sircar, A K, et al, "Carbon Black Transfer in Blends of Cis–Poly(Butadiene) with Other Elastomers," RC&T (1973), 46, pp. 178 and 190.

Lee, B L, Experimental Studies on the Relationship of Processing to the Crack Growth of Carbon–Black–Loaded SBR—cis–Polybutadiene Compounds, Journal of Applied Polymer Science, vol. 27, pp. 3379–3392 (1982).

*Primary Examiner*—Edward J. Cain
*Attorney, Agent, or Firm*—Bruce J Hendricks

[57] ABSTRACT

The present invention relates to a heterogeneous silica/carbon black-filled rubber compound and a process for making the same. The process comprises (a) intimately dispersing substantially all of the silica filler in a first rubber to form a silica-filled compound;

(b) separately intimately dispersing the majority of carbon black in a second rubber, which is different from said first rubber, to form a carbon black-filled compound; and (c) mixing said silica-filled compound with said carbon black-filled compound to form a heterogeneous silica/carbon black-filled rubber compound.

23 Claims, No Drawings

HETEROGENEOUS SILICA CARBON BLACK-FILLED RUBBER COMPOUND

This is a continuation of copending application Ser. No. 08/527,395, filed on Sep. 13, 1995.

BACKGROUND OF THE INVENTION

EP 0 501 227 A discloses methods for the manufacture of silica-based tread compounds. This reference identifies mixing procedures and materials when used improve rolling resistance and wet traction. Unfortunately, such procedures and materials substantially increase the cost of such tires. In order to further justify such costs, further improvement in the properties must be achieved to support the cost increases. Similarly, it is desirable to obtain the improvements disclosed in EP 0 501 227 A but at a lower cost.

SUMMARY OF THE INVENTION

The present invention relates to heterogeneous silica/carbon black-filled rubber compounds and a process for making such compounds.

DETAILED DESCRIPTION OF THE INVENTION

There is disclosed a process for the production of a heterogeneous silica/carbon black-filled rubber compound comprising (a) intimately dispersing substantially all of the silica filler in a first rubber to form a silica-filled compound;

(b) separately intimately dispersing the majority of carbon black in a second rubber, which is different from said first rubber, to form a carbon black-filled compound; and (c) mixing said silica-filled compound with said carbon black-filled compound to form a heterogeneous silica/carbon black-filled rubber compound.

There is also disclosed a heterogenous silica black-filled rubber compound prepared by a process comprising (a) intimately dispersing substantially all of the silica filler in a first rubber to form a silica-filled compound;

(b) separately intimately dispersing the majority of carbon black in a second rubber, which is different from said first rubber, to form a carbon black-filled compound; and (c) mixing said silica-filled compound with said carbon black-filled compound to form a heterogeneous silica/carbon black-filled rubber compound.

The present invention relates to heterogeneous silica/carbon black-filled rubber compound. Heterogeneous as used herein means containing dissimilar ingredients or constituents. More specifically, the term means a rubber compound containing the selective dispersion of substantially all of the silica in a first rubber and the majority of carbon black in a second rubber. Upon subsequent mixing of the two, there is a higher concentration of the silica in one phase (the first rubber) and a higher concentration of the carbon black in another phase (the second rubber).

One critical aspect of the present invention is that the first rubber and second rubber are different. Even though the two rubbers are different, each of the two rubbers may be selected from the same group of rubbers. The first rubber and second rubber may be selected from the group consisting of emulsion polymerized styrene/butadiene copolymers, solution polymerized styrene/butadiene copolymers, natural rubber, cis 1,4-polybutadiene, synthetic cis 1,4-polyisoprene, styrene isoprene copolymers, 3,4-polyisoprene, isoprene/butadiene copolymers, medium vinyl polybutadiene (20 percent to 60 percent by weight of vinyl units), styrene/isoprene/butadiene terpolymers, butyl rubber, polychloroprene, acrylonitrile/butadiene copolymers and ethylene/propylene/diene terpolymers and mixtures thereof. Preferably, the first rubber is solution polymerized styrene/butadiene copolymers, isoprene/butadiene copolymers and mixtures thereof. Preferably, the second rubber is natural rubber.

The first rubber compound, that is which contains substantially all of the silica, comprises from 20 to 80 parts by weight per 100 parts by weight of total rubber (phr) in the heterogeneous silica/carbon black-filled rubber compound. Preferably, the first rubber comprises from 50 to 70 phr.

The second rubber compound, that is which contains the majority or all of the carbon black, comprises from 20 to 80 phr. Preferably, the second comprises from 30 to 50 phr.

In addition to the first and second rubber, additional rubbers may be used. For example, a third or fourth rubber from the above list may be used. Such additional rubbers may be used in a total amount ranging from 10 to 40 phr. If used, the additional rubber(s) are preferably used in an amount ranging from 15 to 35 phr. Examples of a preferred third rubber include cis 1,4-polybutadiene, emulsion polymerized styrene butadiene rubber and 3,4-polyisoprene.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. The Rhone-Poulenc Z1165MP silica is currently preferred.

The silica is added to the heterogeneous silica/carbon black-filled rubber compound in an amount ranging from 10 to 150 phr. Preferably, from 30 to 90 phr of the silica is added. Substantially all of the silica is added to the first rubber compound. Substantially is intended to mean at least 85 weight percent of the total amount of silica used in the compound. Preferably, the total amount of silica is added to the first rubber.

The silica is intimately dispersed in the first rubber to form a silica-filled compound. The mixing may be accomplished by methods known to those skilled in the rubber mixing art. For example, fixed and variable speed mixers or Banburys™ may be used. The first rubber and silica are mixed in a nonproductive mix stage. The final curatives including sulfur vulcanizing agents are typically mixed in the final stage which is conventionally called the "productive" mix stage in which mixing typically occurs at a temperature, or ultimate temperature lower than the mix temperature(s) of the preceding nonproductive stage(s) and always below the subsequent cure temperatures. The silica and first rubber are preferably mixed for a time and temperature to intimately disperse the silica. For example, mixing at a rubber temperature from 130° to 180° C. for a period of from 10 seconds to 20 minutes.

In addition to the first rubber and silica, a silica coupling agent may be present to promote the interaction of the silica and first rubber. Various known silica couplers may be used.

One example of a silica coupler is a sulfur containing organosilicon compound. Examples of sulfur containing organosilicon compounds are of the formula:

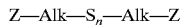

in which Z is selected from the group consisting of

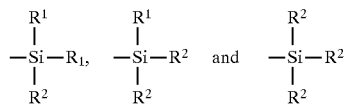 and 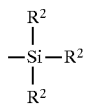

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis (dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec.butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis (triethoxysilylpropyl) tetrasulfide. Therefore, as to the above formula, preferably Z is $$-\underset{\underset{R^2}{|}}{\overset{\overset{R^2}{|}}{Si}}-R^2$$

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound in a rubber composition will vary depending on the level of silica that is used. Generally speaking, the amount of the compound will range from 0.5 to 50 phr. Preferably, the amount will range from 1.5 to 8 phr. Depending on the desired properties, the weight ratio of the sulfur containing organosilicon compound to silica may vary. Generally speaking, the weight ratio will range from 1:100 to 1:5. Preferably, the weight ratio will range from 1:20 to 1:10.

In the second critical step of the present invention, the majority of carbon black is separately and intimately dispersed in the second rubber, which is different from the first rubber, to form a carbon black-filled compound. Typical amounts of reinforcing-type carbon black(s), range from 5 to 150 phr. Preferably, the carbon black level ranges from 10 to 80 phr. Representative of the conventional carbon blacks which may be used in the present invention include those known to those skilled in the art under the ASTM designations N110, N121, N220, N231, N234, N242, N293, N299, S315, N326, N330, N332, N339, N343, N347, N351, N358 and N375.

The weight ratio of silica to carbon black in the overall heterogeneous silica carbon black-filled rubber compound may vary. For example, the weight ratio may be as low as 1:5 to a silica to carbon black ratio of 30:1. Preferably, the weight ratio of silica to carbon black ranges from 1:1 to 6:1. The combined weight of the silica and carbon black may be as low as 15 phr, but is preferably from 45 phr to 90 phr.

As indicated above, the majority (>50 percent by weight) of the total carbon black is mixed in the second rubber. However, essentially all of the carbon black may be added at this stage, with the exception of those rubber chemicals, such as sulfur containing organosilicons which are dispersed on carbon black and added at a different stage of mixing. Preferably from 80 to 100 weight percent of the total carbon black is added to the second rubber not including the carbon black used as a carrier.

It can be readily understood by those having skill in the art that the second rubber composition may be compounded by methods generally known in the rubber compounding art in equipment such as mills, Banburys and the like.

Both the silica-filled compound and carbon black-filled compound may contain various commonly used additive materials such as, for example, processing additives such as oils, resins including tackifying resins and plasticizers, pigments, fatty acid, zinc oxide, waxes, antioxidants and antiozonants and peptizing agents. Depending on the intended use of the heterogeneous silica/carbon black-filled rubber compound, the additives mentioned above are selected and commonly used in conventional amounts. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The above additives may be mixed in the first rubber compound or second rubber compound in any ratio.

The above conventional ingredients may also be added to subsequent mixes including the productive step.

Once the silica-filled first rubber compound has been prepared as well as the carbon black-filled compound containing the second rubber, the two rubber compounds are combined. This may be done as a nonproductive, productive or productive blending step. Alternatively, either the first or second rubber compound can be processed in a separate productive step and subsequently combined with the other nonproductive compound. Preferably, the combination of the two are done at the productive step.

As described above, the productive step involves a mixing stage where the curatives are added. For example, sulfur donors or sulfur vulcanizing agents include elemental sulfur (free sulfur), an amine disulfide, polymeric polysulfide and sulfur olefin additives. Preferably, the sulfur vulcanizing agent is elemental sulfur. The sulfur vulcanizing agent may be used in an amount ranging from 0.5 to 8 phr, with a range of from 0.5 to 4 being preferred. Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

Vulcanization of the rubber composition of the present invention is generally carried out at conventional temperatures ranging from 100° C. to 200° C. Preferably, the vulcanization is conducted at temperatures ranging from 110° C. to 180° C. Any of the usual vulcanization processes may be used such as heating in a press or mold, heating with superheated steam or hot air or in a salt bath.

Upon vulcanization of the sulfur vulcanized composition, the rubber composition of this invention can be used for various purposes. For example, the sulfur vulcanized rubber composition may be in the form of a pneumatic tire, belt, hose, air spring, shoe product and motor mount. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

The following examples are presented in order to illustrate but not limit the present invention.

The following tables report cure properties that were determined from the rubber stocks that were prepared. These properties include tensile modulus, tensile strength, hardness, rebound values and autovibron properties.

EXAMPLE 1

Tables 1 and 2 compare standard "all-in" mixed compounds versus phase-mixed compounds which are of the same formulations (56/24 phr silica/carbon black) using two different polymer blends, either a 70/30 by weight blend of solution SBR/NR or a 70/30 by weight blend of IBR/NR. All of the ingredients in Control 1 and Control 3 were mixed in one nonproductive step. In Samples 2 and 4, two separate nonproductive steps were used. In each nonproductive mixing step, a Kobe™ BB-2 mixer was used. The nonproductive step of all compounds containing silica (Standard and Nonproductive A) utilized variable speed mixing.

For Control 1 and Control 3, the rubber was loaded and mixed at 60 RPM. After 30 seconds, all of the silica coupler and one-half of the silica filler was added. After 60 seconds, the remaining silica, carbon black and other additives were loaded. Once the rubber temperature reached 160° C., the rotor speed was adjusted to maintain 160° C. for 7 minutes. The nonproductive compound was then discharged.

For Nonproductive A in Samples 2 and 4, the above procedure was repeated except no carbon black was added.

For the Nonproductive B step in Samples 2 and 4, the mixing was at 55 rpm. The rubber, carbon black and remaining additives were loaded. After 150 seconds, the rubber temperature was approximately 170° C., the mixing was stopped and its contents removed.

For the Productive step for Controls 1 and 3, one-half of the amount of the nonproductive mix was loaded along with the curatives followed by the remaining one-half of the nonproductive. Mixing was then commenced for approximately 2 minutes at 35 rpm. The rubber temperature reached approximately 90° to 100° C. and the load was discharged.

For the Productive step for Samples 2 and 4, half the Nonproductive A and Nonproductive B were loaded along with the curatives followed by the remaining halves of Nonproductives A and B. Mixing was then commenced for approximately 2 minutes at 35 rpm. The rubber temperature reached approximately 90° to 100° C. and the load was discharged.

In each phase-mixed compound (Samples 2 and 4), the tan delta values (0° C., 11 Hz) were higher (higher =improved wet traction) than for the corresponding standard mixed compounds.

TABLE 2

| Example<br>Mix Procedure | Control 1<br>Standard | 2<br>Phase | Control 3<br>Standard | 4<br>Phase |
|---|---|---|---|---|
| Properties | | | | |
| Tensile Modulus, MPa | | | | |
| 100% | 2.6 | 2.5 | 2.6 | 2.4 |
| 300% | 13.1 | 12.4 | 11.6 | 11.6 |
| Tensile Strength, MPa | 16.3 | 14.0 | 16.0 | 16.1 |
| Hardness, RT | 64 | 63 | 63 | 63 |
| 100° C. | 59 | 58 | 60 | 60 |
| Rebound, RT | 31 | 32 | 36 | 38 |
| 100° C. | 55 | 55 | 60 | 61 |
| Autovibron Properties | | | | |
| @ 11 Hz | | | | |
| Tangent Delta, 0° C. | 0.223 | 0.256 | 0.151 | 0.186 |
| 60° C. | 0.110 | 0.110 | 0.100 | 0.093 |

EXAMPLE 2

Tables 3–6 compare standard mixed compounds versus phase-mixed compounds in a 50/50 by weight NR/solution polymerized SBR blend at a silica/black 30/30 phr ratio.

TABLE 1

STANDARD VS PHASE-MIXED COMPOUNDS

| Sample | Control 1 | 2 | Control 3 | 4 |
|---|---|---|---|---|
| Mix Procedure<br>Component | Standard<br>Nonproductive | Phase<br>Nonproductive A | Standard<br>Nonproductive | Phase<br>Nonproductive A |
| SBR[1] | 70 | 70 | 0 | 0 |
| IBR[2] | 0 | 0 | 70 | 70 |
| Natural Rubber[3] | 30 | 0 | 30 | 0 |
| Silica[4] | 56 | 56 | 56 | 56 |
| Carbon Black[5] | 24 | 0 | 24 | 0 |
| Silica Coupler[6] | 9 | 9 | 9 | 9 |
| Aromatic Oil | 26.2 | 18.3 | 26.2 | 18.3 |
| Stearic Acid | 3 | 2.1 | 3 | 2.1 |
| Zinc Oxide | 2.5 | 1.75 | 2.5 | 1.75 |
| Wax | 1.5 | 1.05 | 1.5 | 1.05 |
| Antioxidant[7] | 2 | 1.4 | 2 | 1.4 |
| | | Nonproductive B | | Nonproductive B |
| Natural Rubber[3] | | 30 | | 30 |
| Carbon Black[5] | | 24 | | 24 |
| Aromatic Oil | | 7.9 | | 7.9 |
| Stearic Acid | | .3 | | .3 |
| Zinc Oxide | | .75 | | .75 |
| Wax | | .45 | | .45 |
| Antioxidant[7] | | .6 | | .6 |
| | Productive | Productive | Productive | Productive |
| Retarder[8] | .15 | .15 | .15 | .15 |
| Sulfur | 1.4 | 1.4 | 1.4 | 1.4 |
| Accelerator[9] | 1.7 | 1.7 | 1.7 | 1.7 |
| Accelerator[10] | 2.0 | 2.0 | 2.0 | 2.0 |

[1]A solution polymerized styrene-butadiene copolymer having a styrene content of 23.5% by weight, 45% by weight vinyl-band content and a Tg of −39° C.. This SBR was acquired from The Firestone Tire & Rubber Co under the designation Duradene ™ 715.
[2]An isoprene-butadiene copolymer prepared via solution polymerization. The IBR had a 50% by weight isoprene content, a 50% by weight butadiene content, a cis-1,4-bond content of 48% and a Tg of −42° C..
[3]SMR-20
[4]Zeosil 1165 MP commercially available from Rhone Poulenc
[5]N299 Black
[6]3,3'-bis(triethoxysilylpropyl)tetrasulfide on a carbon black carrier (50%—50% by weight) commercially obtained from Degussa under the commercial designation X50S
[7]N-1,3 dimethyl butyl N' phenyl paraphenylene diamine
[8]N-cyclohexylthiophthalimide
[9]N-cyclohexyl-benzothiazole-2-sulfenamide
[10]Diphenylguanidine For Controls 5 and 8, the rubber was loaded and mixed at 60 RPM. After 30 seconds, all of the silica coupler and all of the silica filler was added. After 60 seconds, the carbon-black and other additives were loaded. Once the rubber temperature reached 160° C., the rotor speed was adjusted to maintain 160° C. for 7 minutes. The nonproductive compound was then discharged.

For Nonproductive A in Samples 6, 7, 9 and 10, the above procedure was repeated except no carbon black was added and one-half of the silica was added after 30 seconds and the remaining silica added after 60 seconds.

For the Nonproductive B step in Samples 6, 7, 9 and 10, the mixing was at 55 rpm. The rubber, carbon black and remaining additives were loaded. After 150 seconds, the rubber temperature was approximately 170° C., the mixing was stopped and its contents removed.

For the Productive step for Controls 5 and 8, one-half of the amount of the nonproductive mix was loaded along with the curatives followed by the remaining one-half of the nonproductive. Mixing was then commenced for approximately 2 minutes at 35 rpm. The rubber temperature reached approximately 90° to 100° C. and the load was discharged.

For the Productive Step for Samples 6, 7, 9 and 10, half the Nonproductive A and Nonproductive B were loaded along with the curatives. Mixing was then commenced for approximately 2 minutes at 35 rpm. The rubber temperature reached approximately 90° to 100° C. and the load was discharged.

In Tables 4 and 6, it can be seen that the physical properties of the vulcanized phase-mixed compounds (Samples 6, 7, 9 and 10) differ significantly from those of the respective standard mixed control compounds (Samples 5 and 8). Also, it should be noted that phase-mixed compounds 6 and 7 have distinctly different properties from each other. Additionally, properties of phase-mixed compounds 9 and 10 differ from each other. These differences in properties are believed to be due to the selective placement of silica and carbon black in different polymer phases.

TABLE 3
STANDARD VS PHASE-MIXED COMPOUNDS

| Sample | Control 5 | 6 | 7 |
|---|---|---|---|
| Mix Procedure Component | Standard Nonproductive | Phase Nonproductive A | Phase Nonproductive A |
| SBR[1] | 50 | 50 | 0 |
| Natural Rubber[2] | 50 | 0 | 50 |
| Silica[3] | 30 | 30 | 30 |
| Carbon Black[4] | 30 | 0 | 0 |
| Silica Coupler[5] | 5.5 | 5.5 | 5.5 |
| Paraffinic Oil | 10 | 5 | 5 |
| Stearic Acid | 2 | 1 | 1 |
| Zinc Oxide | 3.5 | 1.75 | 1.75 |
| Wax | 1.5 | .75 | .75 |
| Antioxidant[6] | 3.37 | 1.685 | 1.685 |
|  |  | Nonproductive B | Nonproductive |
| SBR[1] |  | 0 | 50 |
| Natural Rubber[2] |  | 50 | 0 |
| Carbon Black[4] |  | 30 | 30 |
| Paraffinic Oil |  | 5 | 5 |
| Stearic Acid |  | 1 | 1 |
| Zinc Oxide |  | 1.75 | 1.75 |
| Wax |  | .75 | .75 |
| Antioxidant[6] |  | 1.685 | 1.685 |
|  | Productive | Productive | Productive |
| Sulfur | 1.3 | 1.3 | 1.3 |
| Accelerator[7] | 1.35 | 1.33 | 1.35 |
| Accelerator[8] | .23 | .23 | .23 |

TABLE 3-continued
STANDARD VS PHASE-MIXED COMPOUNDS

| Sample | Control 5 | 6 | 7 |
|---|---|---|---|

[1]A solution polymerized styrene-butadiene copolymer having a styrene content of 23.5% by weight, 45% by weight vinyl-bond content and a Tg of −39° C.. This SBR was acquired from The Firestone Tire & Rubber Co under the designation Duradene ™ 715.
[2]SMR-20
[3]Hisil 210 MP commercially available from PPG
[4]N299 Black
[5]3,3'-bis(triethoxysilylpropyl)tetrasulfide on a carbon black carrier (50%—50% by weight) commercially obtained from Degussa under the commercially designation X50S
[6]N-1,3 dimethyl butyl N' phenyl paraphenylene diamine
[7]N-cyclohexyl-benzothiazole-2-sulfenamide
[8]Tetramethyl thiuram disulfide

TABLE 4

| Example Mix Procedure | Control 5 Standard | 6 Phase | 7 Phase |
|---|---|---|---|
| Properties |  |  |  |
| Tensile Modulus, MPa |  |  |  |
| 100% | 2.5 | 2.4 | 2.5 |
| 300% | 12.7 | 11.8 | 12.0 |
| Tensile Strength, MPa | 17.8 | 18.4 | 17.6 |
| Hardness, RT | 60 | 61 | 62 |
| 100° C. | 57 | 57 | 59 |
| Rebound, RT | 49 | 47 | 46 |
| 100° C. | 65 | 63 | 64 |
| Autovibron Properties @ 11 Hz |  |  |  |
| Tangent Delta, 0° C. | 0.160 | 0.177 | 0.155 |
| 60° C. | 0.084 | 0.090 | 0.085 |
| E' (MPa), 0° C. | 15.7 | 16.5 | 18.7 |
| 60° C. | 7.8 | 8.6 | 9.4 |

TABLE 5
STANDARD VS PHASE-MIXED COMPOUNDS

| Sample | Control 8 | 9 | 10 |
|---|---|---|---|
| Mix Procedure Component | Standard Nonproductive | Phase Nonproductive A | Phase Nonproductive A |
| SBR[1] | 50 | 50 | 0 |
| Natural Rubber[2] | 50 | 0 | 50 |
| Silica[3] | 30 | 30 | 30 |
| Carbon Black[4] | 30 | 0 | 0 |
| Silica Coupler[5] | 5.5 | 5.5 | 5.5 |
| Paraffinic Oil | 10 | 5 | 5 |
| Stearic Acid | 2 | 1 | 1 |
| Zinc Oxide | 3.5 | 1.75 | 1.75 |
| Wax | 1.5 | .75 | .75 |
| Antioxidant[6] | 3.37 | 1.685 | 1.685 |
|  |  | Nonproductive B | Nonproductive |
| SBR[1] |  | 0 | 50 |
| Natural Rubber[2] |  | 50 | 0 |
| Carbon Black[4] |  | 30 | 30 |
| Paraffinic Oil |  | 5 | 5 |
| Stearic Acid |  | 1 | 1 |
| Zinc Oxide |  | 1.75 | 1.75 |
| Wax |  | .75 | .75 |
| Antioxidant[6] |  | 1.685 | 1.685 |
|  | Productive | Productive | Productive |
| Sulfur | 1.3 | 1.3 | 1.3 |
| Accelerator[7] | 1.35 | 1.35 | 1.35 |
| Accelerator[8] | .23 | .23 | .23 |

TABLE 5-continued

STANDARD VS PHASE-MIXED COMPOUNDS

| Sample | Control 8 | 9 | 10 |
|---|---|---|---|

[1] A solution polymerized styrene-butadiene copolymer having a styrene content of 23.5% by weight, 45% by weight vinyl-band content and a Tg of −39° C.. This SBR was acquired from The Firestone Tire & Rubber Co under the designation Duradene ™ 715.
[2] SMR-20
[3] Hisil 210 MP commercially available from PPG
[4] N-351 Black
[5] 3,3'-bis(triethoxysilylpropyl)tetrasulfide on a carbon black carrier (50%—50% by weight) commercially obtained from Degussa under the commercially designation X50S
[6] N-1,3 dimethyl butyl N' phenyl paraphenylene diamine
[7] N-cyclohexyl-benzothiazole-2-sulfenamide
[8] Tetramethyl thiuram disulfide

TABLE 6

| Example Mix Procedure | Control 8 Standard | 9 Phase | 10 Phase |
|---|---|---|---|
| Properties | | | |
| Tensile Modulus, MPa | | | |
| 100% | 2.4 | 2.1 | 2.3 |
| 300% | 13.0 | 11.5 | 11.8 |
| Tensile Strength, MPa | 16.4 | 17.9 | 17.5 |
| Hardness, RT | 58 | 57 | 61 |
| 100° C. | 56 | 55 | 58 |
| Rebound, RT | 54 | 51 | 49 |
| 100° C. | 68 | 64 | 64 |
| Autovibron Properties @ 11 Hz | | | |
| Tangent Delta, 0° C. | 0.148 | 0.153 | 0.133 |
| 60° C. | 0.071 | 0.085 | 0.079 |
| E' (MPa), 0° C. | 12.5 | 15.0 | 20.5 |
| 60° C. | 7.0 | 7.7 | 9.9 |

What is claimed is:

1. A process for the production of a heterogeneous silica/carbon black-filled rubber compound comprising
   (a) intimately dispersing 0.5 to 50 phr of a silica coupler selected from the group consisting of organosilicon compounds of the formula:

Z—Alk—$S_n$—Alk—Z in which Z is selected from the group consisting of

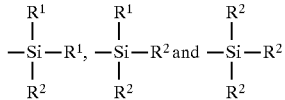

where
   $R^1$ is an alkyl group of 1 to 4 carbon atoms, cyclohexyl or phenyl;
   $R^2$ is alkoxy of 1 to 8 carbon atoms, or cycloalkoxy of 5 to 8 carbon atoms;
   Alk is a divalent hydrocarbon of 1 to 18 carbon atoms and n is an integer of 2 to 8;
   and substantially all of the silica filler, wherein the weight ratio of said sulfur containing organosilicon compound to silica filler ranges from 1:100 to 1:5, in a first rubber by mixing at a rubber temperature of from 130° C. to 180° C. for a period of from 10 seconds to 20 minutes to form a silica-filled compound;
   (b) separately and intimately dispersing the majority of carbon black in a second rubber, which is different from said first rubber to form a carbon black-filled compound
   (c) mixing said silica-filled compound with said carbon black-filled compound to form a heterogeneous silica/carbon black-filled rubber compound.

2. The process of claim 1 wherein said first rubber and said second rubber are selected from the group consisting of emulsion polymerized styrene/butadiene copolymers, solution polymerized styrene/butadiene copolymers, cis 1,4-polyisoprene, natural rubber, cis 1,4-polybutadiene, styrene isoprene copolymers, 3,4-polyisoprene, isoprene/butadiene copolymers, medium vinyl polybutadiene, styrene/isoprene/butadiene terpolymers, butyl rubber, polychloroprene, acrylonitrile/butadiene copolymers and ethylene/propylene/diene terpolymers and mixtures thereof.

3. The process of claim 2 wherein said first rubber is selected from the group consisting of solution polymerized styrene/butadiene copolymers, isoprene/butadiene copolymers and mixtures thereof.

4. The process of claim 2 wherein said second rubber is natural rubber.

5. The process of claim 1 wherein a sulfur vulcanization agent and at least one accelerator is present when said silica-filled compound is mixed with said carbon black-filled compound.

6. The process of claim 1 wherein from 10 to 150 phr of a silica filler is intimately dispersed with said first rubber compound to form said silica-filled compound.

7. The process of claim 1 wherein from 5 to 150 phr of carbon black is intimately dispersed with said second rubber compound to form said carbon black-filled compound.

8. The process of claim 1 wherein from 20 phr to 80 phr is the first rubber compound.

9. The process of claim 1 wherein from 20 phr to 80 phr is the second rubber compound.

10. The process of claim 1 wherein said silica filler has a BET surface area in the range of from 40 to 600 square meters per gram and a DBP absorption value in the range of from 100 to 400 and an ultimate particle size in the range of from 0.01 to 0.05 micron.

11. A heterogeneous silica/carbon black-filled rubber compound prepared by a process comprising
    (a) intimately dispersing 0.5 to 50 phr of a silica coupler selected from the group consisting of organosilicon compounds of the formula:

Z—Alk—$S_n$—Alk—Z in which Z is selected from the group consisting of

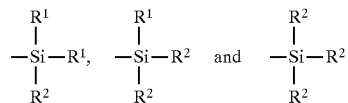

where
    $R^1$ is an alkyl group of 1 to 4 carbon atoms, cyclohexyl or phenyl;
    $R^2$ is alkoxy of 1 to 8 carbon atoms, or cycloalkoxy of 5 to 8 carbon atoms;
    Alk is a divalent hydrocarbon of 1 to 18 carbon atoms and n is an integer of 2 to 8;
    and substantially all of the silica filler, wherein the weight ratio of said sulfur containing organosilicon compound to silica filler ranges from 1:100 to 1:5, in a first rubber by mixing at a rubber temperature of from 130° C. to 180° C. for a period of from 10 seconds to 20 minutes to form a silica-filled compound;
    (b) separately and intimately dispersing the majority of carbon black in a second rubber, which is different from said first rubber to form a carbon black-filled compound (c) mixing said silica-filled compound with said carbon black-filled compound to form a heterogeneous silica/carbon black-filled rubber compound.

12. The compound of claim 11 wherein said first rubber and said second rubber are selected from the group consisting of emulsion polymerized styrene/butadiene copolymers, solution polymerized styrene/butadiene copolymers, natural rubber, cis 1,4-polybutadiene, styrene isoprene copolymers, isoprene/butadiene copolymers, medium vinyl polybutadiene, styrene/isoprene/butadiene terpolymers, butyl rubber, polychloroprene, acrylonitrile/butadiene copolymers and ethylene/propylene/diene terpolymers and.

13. The compound of claim 12 wherein said first rubber is selected from the group consisting of solution polymerized styrene/butadiene copolymers, isoprene/butadiene copolymers and mixtures thereof.

14. The compound of claim 12 wherein said second rubber is natural rubber.

15. The compound of claim 11 wherein a sulfur vulcanization agent and at least one accelerator is present when said silica-filled compound is mixed with said carbon black-filled compound.

16. The compound of claim 11 wherein from 10 to 150 phr of a silica filler is intimately dispersed with said first rubber compound to form said silica-filled compound.

17. The compound of claim 11 wherein from 5 to 15 phr of carbon black is intimately dispersed with said second rubber compound to form said carbon black-filled compound.

18. The compound of claim 11 wherein from 20 phr to 80 phr is the first rubber compound.

19. The compound of claim 11 wherein from 20 phr to 80 phr is the second rubber compound.

20. The compound of claim 11 wherein said rubber filler has a BET surface area in the range of from 40 to 600 square meters per gram and a DBP absorption value in the range of from 100 to 400 and an ultimate particle size in the range of from 0.01 to 0.05 micron.

21. The compound of claim 11 which is vulcanized at a temperature ranging from 100° C. to 200° C.

22. The compound of claim 11 which is in the form selected from the group consisting of a pneumatic tire, belt, hose, air spring, shoe product and motor mount.

23. A pneumatic tire having a tread comprised of the composition of claim 11.

* * * * *